US007367498B2

(12) United States Patent
Kodaka et al.

(10) Patent No.: US 7,367,498 B2
(45) Date of Patent: May 6, 2008

(54) POS TERMINAL AND SYSTEM INCLUDING THE SAME BY WHICH A TRANSACTION LOG CAN BE REVISED AND REGISTERED AS A NEW TRANSACTION

(75) Inventors: Yoshihiro Kodaka, Kawasaki (JP); Takamasa Kondo, Kawasaki (JP); Yuko Muto, Kawasaki (JP); Shogo Adachi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 713 days.

(21) Appl. No.: 10/102,676

(22) Filed: Mar. 22, 2002

(65) Prior Publication Data

US 2003/0065566 A1    Apr. 3, 2003

(30) Foreign Application Priority Data

Sep. 28, 2001 (JP) .............................. 2001-302986

(51) Int. Cl.
*G06K 15/00* (2006.01)
(52) U.S. Cl. .................... 235/383; 235/385; 705/16
(58) Field of Classification Search ............ 705/16–25; 235/375, 376, 383, 385; 707/10, 100, 104.1
See application file for complete search history.

(56) References Cited

U.S. PATENT DOCUMENTS

| 3,946,220 A | * | 3/1976 | Brobeck et al. ............. 705/25 |
| 4,607,334 A | * | 8/1986 | Shiono et al. ................ 705/16 |
| 4,774,662 A | * | 9/1988 | Ito et al. ...................... 705/42 |
| 4,853,864 A | * | 8/1989 | Hart et al. ................... 705/403 |
| 4,958,291 A | * | 9/1990 | Mamone et al. ............ 705/404 |
| 5,367,464 A | * | 11/1994 | Abumehdi et al. ......... 705/403 |
| 5,396,417 A | * | 3/1995 | Burks et al. .................. 705/17 |
| 5,450,319 A | * | 9/1995 | Ishikawa et al. ............. 705/18 |
| 5,870,716 A | * | 2/1999 | Sugiyama et al. ........... 705/26 |
| 5,988,498 A | * | 11/1999 | Hoell ......................... 235/383 |
| 6,012,040 A | * | 1/2000 | Goodwin, III .............. 705/20 |
| 6,179,206 B1 | * | 1/2001 | Matsumori .................. 235/383 |
| 6,199,049 B1 | * | 3/2001 | Conde et al. ................ 705/24 |
| 6,439,345 B1 | * | 8/2002 | Recktenwald et al. ....... 186/55 |

(Continued)

FOREIGN PATENT DOCUMENTS

JP       60-20280       2/1985

(Continued)

OTHER PUBLICATIONS

Japanese Patent Office Action, mailed March 6, 2007, and issued in priority Japanese Patent Application No. 2001-302986.

*Primary Examiner*—Andrew Joseph Rudy
(74) *Attorney, Agent, or Firm*—Staas & Halsey LLP

(57) ABSTRACT

A terminal apparatus and a transaction information management system consisting of the terminal apparatus and a management apparatus that can revise transaction information, which is stored in the management apparatus, connected to a previous transaction when a customer purchases an additional item of merchandise or returns merchandise that has been purchased. By looking up price information stored in the management apparatus each time the transaction information is revised, the revised transaction information can correctly reflect a quantity discount, for example. A new receipt indicating all the merchandise purchased as a result can be printed.

9 Claims, 29 Drawing Sheets

U.S. PATENT DOCUMENTS

| | | | |
|---|---|---|---|
| 6,845,363 B1 * | 1/2005 | Matsubara et al. | 705/16 |
| 2002/0046124 A1 * | 4/2002 | Alderucci et al. | 705/20 |
| 2002/0169673 A1 * | 11/2002 | Prorock et al. | 705/16 |
| 2004/0064417 A1 * | 4/2004 | Stefik et al. | 705/52 |
| 2005/0197907 A1 * | 9/2005 | Weiss | 705/22 |

FOREIGN PATENT DOCUMENTS

| | | | |
|---|---|---|---|
| JP | 05183606 A * | 7/1993 | |
| JP | 7-168976 | 7/1995 | |
| JP | 7-192172 | 7/1995 | |
| JP | 07168976 A * | 7/1995 | |
| JP | 8-167077 | 6/1996 | |
| JP | 10-151809 | 6/1998 | |
| JP | 10-255168 | 9/1998 | |
| JP | 2001-266259 | 9/2001 | |

* cited by examiner

FIG.3

| | | | | | | | |
|---|---|---|---|---|---|---|---|
| DISCOUNT 1 | CLEAR | | × | SERIAL NUMBER RETRIEVAL | DEPT 1 | DEPT 2 | DEPT 3 | DEPT 4 |
| DISCOUNT 2 | 7 | 8 | 9 | TWO-OPERATOR MODE | DEPT 5 | DEPT 6 | DEPT 7 | DEPT 8 |
| DISCOUNT 3 | 4 | 5 | 6 | SUSPEND | DEPT 9 | DEPT 10 | DEPT 11 | DEPT 12 |
| REGIST-RATION | 1 | 2 | 3 | RESUME | DEPT 13 | DEPT 14 | DEPT 15 | DEPT 16 |
| | 0 | 0 | | CASH RECEIVED /TOTAL | | SUBTOTAL | | ¥10,000 BILL |

FIG.5

| DEPT CODE ↙ C1 | MERCHANDISE CODE ↙ C2 | PLU CODE ↙ C3 | MERCHANDISE NAME ↙ D | UNIT PRICE ↙ P |
|---|---|---|---|---|
| C11 | C21 | C31 | D1 | P1 |
| .. | .. | .. | .. | .. |
| C1m | C2m | C3m | Dm | Pm |

FIG.6A

TRANSACTION LOG
DATABASE REGION 63

| TRANSACTION IDENTIFICATION INFORMATION D11 | TRANSACTION SERIAL NUMBER D111 |
| --- | --- |
| | TERMINAL NUMBER D112 |
| | TRANSACTION CLASSIFICATION D113 |
| MERCHANDISE INFORMATION D12 | DETAILED INFORMATION #1 D121 |
| | DETAILED INFORMATION #2 D122 |
| | ⋮ |
| | DETAILED INFORMATION #n D12n |
| PAYMENT INFORMATION D13 | |

| PLU CODE Cs | QUANTITY Da | TAX INFORMATION Db | MERCHANDISE NAME Dc | UNIT PRICE Dd | ---- | MANUAL DISCOUNT INFORMATION De |
| --- | --- | --- | --- | --- | --- | --- |

FIG.7

| 64 | | | | | | | | |
|---|---|---|---|---|---|---|---|---|
| | DEPT CODE ↙ C1 | MERCHANDISE CODE ↙ C2 | PLU CODE ↙ C3 | MERCHANDISE NAME ↙ D | UNIT PRICE ↙ P | QUANTITY REQUIRED FOR QUANTITY DISCOUNT ↙ B1 | QUANTITY DISCOUNT AMOUNT ↙ B2 | QUANTITY DISCOUNT NUMBER ↙ B3 |
| | C11 | C21 | C31 | D1 | P1 | B11 | B21 | B31 |
| | .. | .. | .. | .. | .. | .. | .. | .. |
| | C1k | C2k | C3k | Dk | Pk | B1k | B2k | B3k |

FIG.11

| SERIAL NUMBER RETRIEVAL | | | CHECKER | 2001/9/28 10:27 | |
|---|---|---|---|---|---|
| | | | CASHIER : HANAKO | POS 0003 | |
| No. | MERCHANDISE | UNIT PRICE | QUANTITY | TOTAL DISCOUNT | TOTAL PRICE |
| | | | | | |
| | | | | | |
| | | | | | |
| | | | | | |
| | | | | | |
| | SUBTOTAL | | TOTAL | | |
| | DISCOUNT SUBTOTAL | | | | |
| | TAX AMOUNT | | CASH RECEIVED | | |
| TRANSACTION SERIAL No. | TOTAL QUANTITY | | CHENGE | | |
| CUSTOMER | PREV. SERIAL No. | | | | |
| CUSTOMER CATEGORY | | | | | |
| PREVIOUS TERMINAL No. | | | | | |
| PLEASE INPUT PREVIOUS TERMINAL NUMBER | | | 1 | | |

FIG.12

SERIAL NUMBER RETRIEVAL | | CHECKER | | 2001/9/28 10:27 |
| | | CASHIER : HANAKO | | POS 0003 |

| No. | MERCHANDISE | UNIT PRICE | QUANTITY | TOTAL DISCOUNT | TOTAL PRICE |
|---|---|---|---|---|---|
| 1 | KOBE BEEF | ¥980 | 1 | | ¥980 |
| 2 | POTATO CHIPS | ¥150 | 2 | | ¥300 |
| | | | | | |
| | | | | | |
| | | | | | |
| | | | | | |

| | | | |
|---|---|---|---|
| TRANSACTION SERIAL No. | | SUBTOTAL | ¥1,280 |
| CUSTOMER | | DISCOUNT SUBTOTAL | ¥0 |
| CUSTOMER CATEGORY | | TAX AMOUNT | ¥64 |
| | | TOTAL QUANTITY | 3 |
| PREVIOUS TERMINAL No. | 1 | PREV. SERIAL No. | 777 |

TOTAL　¥1,344

CASH RECEIVED

CHENGE

PLEASE VERIFY DETAILS AND PRESS REGISTRATION KEY

FIG.13

| SERIAL NUMBER RETRIEVAL | | | CHECKER | | 2001/9/28 10:27 | |
|---|---|---|---|---|---|---|
| | | | CASHIER : HANAKO | | POS 0003 | |
| No. | MERCHANDISE | UNIT PRICE | QUANTITY | TOTAL DISCOUNT | | TOTAL PRICE |
| 1 | KOBE BEEF | ¥980 | 1 | | | ¥980 |
| 2 | POTATO CHIPS | ¥150 | 2 | | | ¥300 |
| | | | | | | |
| | | | | | | |
| | | | | | | |
| | | | | | | |
| TRANSACTION SERIAL No. | 780 | SUBTOTAL | ¥1,280 | TOTAL | | ¥1,344 |
| CUSTOMER | | DISCOUNT SUBTOTAL | ¥0 | | | |
| CUSTOMER CATEGORY | | TAX AMOUNT | ¥64 | CASH RECEIVED | | |
| | | TOTAL QUANTITY | 3 | | | |
| PREVIOUS TERMINAL No. | 1 | PREV. SERIAL No. | 777 | CHENGE | | |

FIG.14

SERIAL NUMBER RETRIEVAL

| | | CHECKER | 2001/9/28 10:27 | |
|---|---|---|---|---|
| | | CASHIER : HANAKO | POS 0003 | |
| No. | MERCHANDISE | UNIT PRICE | QUANTITY | TOTAL DISCOUNT | TOTAL PRICE |
| 1 | KOBE BEEF | ¥980 | 1 | | ¥980 |
| 2 | POTATO CHIPS | ¥150 | 3 | | ¥450 |
| 3 | CHOCOLATE BAR | ¥150 | 1 | | ¥150 |
| | | | | | |

| TRANSACTION SERIAL No. | 780 | SUBTOTAL | ¥1,580 | TOTAL | ¥1,659 |
|---|---|---|---|---|---|
| CUSTOMER | | DISCOUNT SUBTOTAL | ¥0 | | |
| CUSTOMER CATEGORY | | TAX AMOUNT | ¥79 | CASH RECEIVED | ¥1,744 |
| | | TOTAL QUANTITY | 5 | | |
| PREVIOUS TERMINAL No. | 1 | PREV. SERIAL No. | 777 | CHENGE | ¥85 |

ADDITION :  ¥315

FIG.17

| SERIAL NUMBER RETRIEVAL | | | CHECKER | 2001/9/28 10:27 | |
|---|---|---|---|---|---|
| | | | CASHIER : HANAKO | POS 0003 | |
| No. | MERCHANDISE | UNIT PRICE | QUANTITY | TOTAL DISCOUNT | TOTAL PRICE |
| | | | | | |
| | | | | | |
| | | | | | |
| | | | | | |
| | SUBTOTAL | | TOTAL | | |
| | DISCOUNT SUBTOTAL | | | | |
| | TAX AMOUNT | | CASH RECEIVED | | |
| TRANSACTION SERIAL No. | TOTAL QUANTITY | | CHENGE | | |
| CUSTOMER | PREV. SERIAL No. | | | | |
| CUSTOMER CATEGORY | | | | | |
| PREVIOUS TERMINAL No. | 1 | | | | |
| PLEASE INPUT PREVIOUS TERMINAL NUMBER | | | | | |

FIG.18

| SERIAL NUMBER RETRIEVAL | | CHECKER | | 2001/9/28 10:27 | |
|---|---|---|---|---|---|
| | | CASHIER : HANAKO | | POS 0003 | |
| No. | MERCHANDISE | UNIT PRICE | QUANTITY | TOTAL DISCOUNT | TOTAL PRICE |
| 1 | KOBE BEEF | ¥980 | 1 | | ¥980 |
| 2 | POTATO CHIPS | ¥150 | 2 | | ¥300 |
| | | | | | |
| | | | | | |
| | | | | | |
| | | | | | |
| | SUBTOTAL | ¥1,280 | TOTAL | ¥1,344 | |
| | DISCOUNT SUBTOTAL | ¥0 | | | |
| | TAX AMOUNT | ¥64 | CASH RECEIVED | | |
| | TOTAL QUANTITY | 3 | | | |
| TRANSACTION SERIAL No. | PREV. SERIAL No. | 777 | CHENGE | | |
| CUSTOMER | | | | | |
| CUSTOMER CATEGORY | | | | | |
| PREVIOUS TERMINAL No. | 1 | | | | |
| PLEASE VERIFY DETAILS AND PRESS REGISTRATION KEY | | | | | |

FIG.19

SERIAL NUMBER RETRIEVAL

| | | CHECKER | 2001/9/28 10:27 | |
|---|---|---|---|---|
| | | CASHIER : HANAKO | POS 0003 | |
| No. | MERCHANDISE | UNIT PRICE | QUANTITY | TOTAL DISCOUNT | TOTAL PRICE |
| 1 | KOBE BEEF | ¥980 | 1 | | ¥980 |
| 2 | POTATO CHIPS | ¥150 | 2 | | ¥300 |
| | | | | | |
| | | | | | |
| | | | | | |
| | | | | | |
| | | | | | |

| TRANSACTION SERIAL No. | 780 | SUBTOTAL | ¥1,280 | TOTAL | ¥1,344 |
| CUSTOMER | | DISCOUNT SUBTOTAL | ¥0 | | |
| CUSTOMER CATEGORY | | TAX AMOUNT | ¥64 | CASH RECEIVED | |
| | | TOTAL QUANTITY | 3 | | |
| PREVIOUS TERMINAL No. | 1 | PREV. SERIAL No. | 777 | CHENGE | |

FIG.20

SERIAL NUMBER RETRIEVAL

| | | CHECKER | | 2001/9/28 10:27 | |
|---|---|---|---|---|---|
| | | CASHIER : HANAKO | | POS 0003 | |
| No. | MERCHANDISE | UNIT PRICE | QUANTITY | TOTAL DISCOUNT | TOTAL PRICE |
| 1 | KOBE BEEF | ¥980 | 1 | | ¥980 |
| 2 | POTATO CHIPS | ¥150 | 3 | −¥50 | ¥400 |
| | | | | | |
| | | | | | |
| | | | | | |

| TRANSACTION SERIAL No. | 780 | SUBTOTAL | ¥1,380 | TOTAL | ¥1,449 |
|---|---|---|---|---|---|
| CUSTOMER | | DISCOUNT SUBTOTAL | ¥0 | | |
| CUSTOMER CATEGORY | | TAX AMOUNT | ¥69 | CASH RECEIVED | ¥1,454 |
| | | TOTAL QUANTITY | 4 | | |
| PREVIOUS TERMINAL No. | 1 | PREV. SERIAL No. | 777 | CHENGE | ¥5 |

ADDITION : ¥105

THANK YOU FOR SHOPPING AT ABC STORE.
WE ARE LOOKING FORWARD TO SERVING
YOU AGAIN

SATURDAY, SEPTEMBER 28, 2001     10:00 AM

KOBE BEEF                          ¥980
POTATO CHIPS
@¥150          2 PCS.              ¥300

SUBTOTAL     3 ITEMS              ¥1,280
(TAXABLE AMOUNT                   ¥1,280)
CONSUMPTION TAX 5.0%                ¥64

TOTAL                             ¥1,344
CASH RECEIVED                     ¥2,000
CHANGE                              ¥656

CASHIER: 0001                     ICHIRO
R0001-#0777

FIG.23

| SERIAL NUMBER RETRIEVAL | | | CHECKER | 2001/9/28 10:27 | |
|---|---|---|---|---|---|
| | | | CASHIER : HANAKO | POS 0003 | |
| No. | MERCHANDISE | UNIT PRICE | QUANTITY | TOTAL DISCOUNT | TOTAL PRICE |
| | | | | | |
| | | | | | |
| | | | | | |
| | | | | | |
| | | SUBTOTAL | | TOTAL | |
| TRANSACTION SERIAL No. | | DISCOUNT SUBTOTAL | | | |
| CUSTOMER | | TAX AMOUNT | | CASH RECEIVED | |
| CUSTOMER CATEGORY | | TOTAL QUANTITY | | | |
| PREVIOUS TERMINAL No. | | PREV. SERIAL No. | | CHENGE | |
| PLEASE INPUT PREVIOUS TERMINAL NUMBER | | | | 1 | |

FIG.24

| SERIAL NUMBER RETRIEVAL | | | CHECKER | 2001/9/28 10:27 | |
|---|---|---|---|---|---|
| | | | CASHIER : HANAKO | POS 0003 | |
| No. | MERCHANDISE | UNIT PRICE | QUANTITY | TOTAL DISCOUNT | TOTAL PRICE |
| 1 | KOBE BEEF | ¥980 | 1 | | ¥980 |
| 2 | POTATO CHIPS | ¥150 | 3 | −¥50 | ¥400 |
| | | | | | |
| | | | | | |
| | | SUBTOTAL | ¥1,380 | TOTAL | ¥1,449 |
| | | DISCOUNT SUBTOTAL | ¥0 | | |
| | | TAX AMOUNT | ¥69 | CASH RECEIVED | |
| | | TOTAL QUANTITY | 4 | | |
| | | PREV. SERIAL No. | 777 | CHENGE | |
| TRANSACTION SERIAL No. | | | | | |
| CUSTOMER | | | | | |
| CUSTOMER CATEGORY | | | | | |
| PREVIOUS TERMINAL No. | 1 | | | | |
| PLEASE VERIFY DETAILS AND PRESS REGISTRATION KEY | | | | | |

FIG.25

SERIAL NUMBER RETRIEVAL | | | CHECKER | 2001/9/28 10:27 | |
| | | | CASHIER : HANAKO | POS 0003 | |

| No. | MERCHANDISE | UNIT PRICE | QUANTITY | TOTAL DISCOUNT | TOTAL PRICE |
|---|---|---|---|---|---|
| 1 | KOBE BEEF | ¥980 | 1 | | ¥980 |
| 2 | POTATO CHIPS | ¥150 | 3 | −¥50 | ¥400 |

| | | | |
|---|---|---|---|
| TRANSACTION SERIAL No. | 780 | SUBTOTAL | ¥1,380 |
| CUSTOMER | | DISCOUNT SUBTOTAL | ¥0 |
| CUSTOMER CATEGORY | | TAX AMOUNT | ¥69 |
| | | TOTAL QUANTITY | 4 |
| PREVIOUS TERMINAL No. | 1 | PREV. SERIAL No. | 777 |

| TOTAL | ¥1,449 |
|---|---|
| CASH RECEIVED | |
| CHENGE | |

FIG.26

| SERIAL NUMBER RETRIEVAL | | CHECKER | | 2001/9/28 10:30 | |
|---|---|---|---|---|---|
| | | CASHIER : HANAKO | | POS 0003 | |
| No. | MERCHANDISE | UNIT PRICE | QUANTITY | TOTAL DISCOUNT | TOTAL PRICE |
| 1 | KOBE BEEF | ¥980 | 1 | | ¥980 |
| 2 | POTATO CHIPS | ¥150 | 2 | | ¥300 |
| | | | | | |
| | | | | | |
| | | | | | |
| | | | | | |
| TRANSACTION SERIAL No. | 780 | SUBTOTAL | ¥1,280 | TOTAL | ¥1,344 |
| CUSTOMER | | DISCOUNT SUBTOTAL | ¥0 | | |
| CUSTOMER CATEGORY | | TAX AMOUNT | ¥64 | CASH RECEIVED | |
| | | TOTAL QUANTITY | 3 | | |
| PREVIOUS TERMINAL No. | 1 | PREV. SERIAL No. | 777 | CHENGE | |
| ADDITION : | ¥105 | | | | |

FIG.28

THANK YOU FOR SHOPPING AT ABC STORE.
WE ARE LOOKING FORWARD TO SERVING
YOU AGAIN

SATURDAY, SEPTEMBER 28, 2001     10:30 AM

| | |
|---|---|
| KOBE BEEF | ¥980 |
| POTATO CHIPS | |
| @¥150    2 PCS. | ¥300 |
| | |
| SUBTOTAL    3 ITEMS | ¥1,280 |
| (TAXABLE AMOUNT | ¥1,280) |
| CONSUMPTION TAX 5.0% | ¥64 |
| | |
| TOTAL | ¥1,344 |
| CASH RECEIVED | ¥2,000 |
| CHANGE | ¥656 |
| CASHIER: 0003 | HANAKO |
| R0003-#0780 | |

POS TERMINAL AND SYSTEM INCLUDING THE SAME BY WHICH A TRANSACTION LOG CAN BE REVISED AND REGISTERED AS A NEW TRANSACTION

BACKGROUND OF THE INVENTION

1. Field of the Invention

The present invention generally relates to a terminal apparatus, transaction information management system, transaction information management method, and a computer program thereof. The present invention more particularly relates to a terminal apparatus, a transaction information management system, a transaction information management method, and a computer program thereof with which transaction information such as goods and services that are dealt with by customers and suppliers is registered, and the goods and services are managed.

2. Description of the Related Art

Large and middle-sized retail shops have been equipped with point-of-sale (POS) systems. A POS system is configured by POS terminal apparatuses and upper rank apparatuses connected to a network. A POS terminal apparatus registers each transaction by scanning a bar-code attached to merchandise and generates transaction information that is sent to an upper rank apparatus. The upper rank apparatus receives the transaction information and manages it as a transaction log.

Once the transaction information is registered by the upper rank apparatus, the transaction information cannot be altered easily in order to avoid illegal alteration. In real businesses, however, POS operators often wish to add and/or cancel an item after the transaction information is registered. It is often desired that the transaction information that has already been registered by the upper rank apparatus be revised.

As one of the related arts, a sales registration data processing apparatus has been proposed as described in the Japanese Laid-open patent application No. 7-168976.

In the Japanese Laid-open patent application No. 7-168976 describes a technique in which a POS operator (cashier) can retrieve the transaction information from the upper rank apparatus and revise it. The sales registration data processing apparatus of the Japanese Laid-open patent application No. 7-168976 can correct the transaction information that was registered in the past, but cannot add an item at all. The sales registration data processing apparatus of the Japanese Laid-open patent application No. 7-168976 can print a receipt of the item that is corrected, but cannot print a receipt corresponding to the transaction information in which the new item is included.

The sales registration data processing apparatus described in the Japanese Laid-open patent application No. 7-168976 only corrects the transaction information that has been registered, but cannot add new items at all. In the case of conventional POS systems, an addition of a new item is regarded as a new transaction, and transaction information corresponding to the new item is registered separately from the existing transaction information. The receipt corresponding to the new item is issued separately from the receipt of the existing transaction information. A receipt corresponding to the new item is issued in addition to the receipt issued for the past transaction.

SUMMARY OF THE INVENTION

Accordingly, it is a general object of the present invention to provide a novel and useful POS terminal, a POS system including the same, a method of registering transaction logs, and a recording medium storing a computer program embodying the method in which one or more of the problems described above is eliminated.

Another and more specific object of the present invention is to provide a POS terminal that can revise a transaction log.

In order to achieve the above objects, a POS terminal that registers, through a computer network, a transaction log in a transaction database, wherein the transaction log cannot be altered by a cashier, according to the present invention, includes a central processing unit that acquires first identification information of a transaction log and retrieves, from the transaction database, the transaction log indicating merchandise, a quantity thereof, and a unit price thereof, wherein the central processing unit further determines whether the transaction log is in a revisable state, and revises, if the transaction log is in the revisable state, the transaction log by allowing a cashier to change an item of merchandise and the quantity thereof and determining the unit price of the item of merchandise by reference to price information stored in a price database, and registers the revised transaction log in the transaction database as a new transaction log having second identification information.

The POS terminal according to the present invention creates a new transaction log by revising a transaction log retrieved from the transaction database and allowing a cashier to add new items, change the quantity of items, or cancel a purchase of items. After revising the transaction log, the cashier can register the transaction log as a new transaction log having new identification information such as a transaction serial number.

Other objects, features, and advantages of the present invention will become more apparent from the following detailed description when read in conjunction with the accompanying drawings.

BRIEF DESCRIPTION OF THE DRAWINGS

FIG. 3 is a schematic drawing showing the key arrangement of a keyboard 22 according to the embodiment;

FIG. 5 is a schematic drawing showing the data structure of a PLU master database region 64 according to the embodiment;

FIGS. 6A and 6B are schematic drawings showing the data structure of a transaction log database region 63 according to the embodiment;

FIG. 7 is a schematic drawing showing the data structure of a quantity discount master database region 64 according to the embodiment;

FIGS. 11-14 are schematic drawings showing the transition of screens according to the embodiment in the case that additional pieces of merchandise are purchased;

FIGS. 17-20 are schematic drawings showing the transition of screens according to the embodiment in the case that additional pices of merchandise are purchased and a quantity discount is applied;

FIGS. 23-26 are schematic drawings showing the transition of screens according to the embodiment in the case that a purchase of merchandise is cancelled and a corresponding quantity discount is also canceled; and FIGS. 27 and 28 are schematic drawings showing receipts printed for a previous transaction and a new transaction according to the embodiment.

DETAILED DESCRIPTION OF THE PREFERRED EMBODIMENTS

A detailed description of the preferred embodiments of the present invention will be given below.

Figure 1:
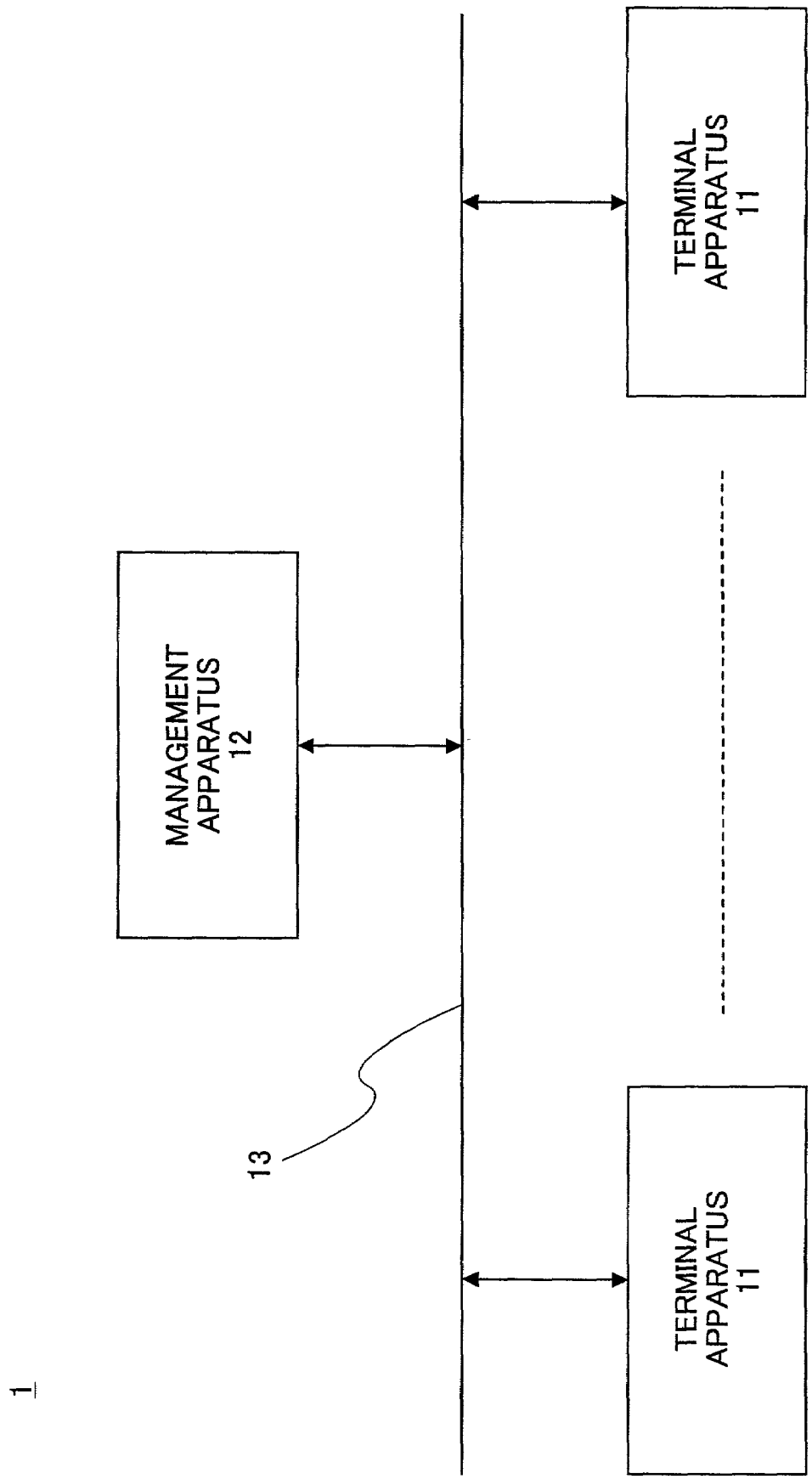
FIG. 1 is a schematic drawing showing the system configuration according to an embodiment of the present invention.

FIG. 1 is a schematic drawing showing a system structure according to an embodiment.

A transaction information management system 1 according to an embodiment is a point of sales (POS) system that manages inventories and sales of goods. The transaction information management system 1 includes terminal apparatuses 11 and a management apparatus 12 that can communicate with each other through a network 13. The terminal apparatus 11 is a so-called POS terminal apparatus.

When a merchandise code is input with a keyboard or a scanner that scans a bar-code, the terminal apparatus 11 accesses a database stored in the management apparatus 12 by referring to the merchandise code and generates transaction information indicating a detailed description of the item of merchandise and its price. The terminal apparatus 11 outputs the transaction information through a printer and sends the transaction information to the management apparatus 12 through the network 13. The management apparatus 12 manages the transaction information as a transaction log.

In the case of the transaction information management system 1 according to the embodiment, the terminal apparatus 11 can retrieve transaction information that has been stored in the management apparatus 12 as a transaction log, and new transaction information is generated based on the retrieved transaction information and is reissued to the management apparatus 12.

The terminal apparatus 11 is described in detail.

Figure 2:
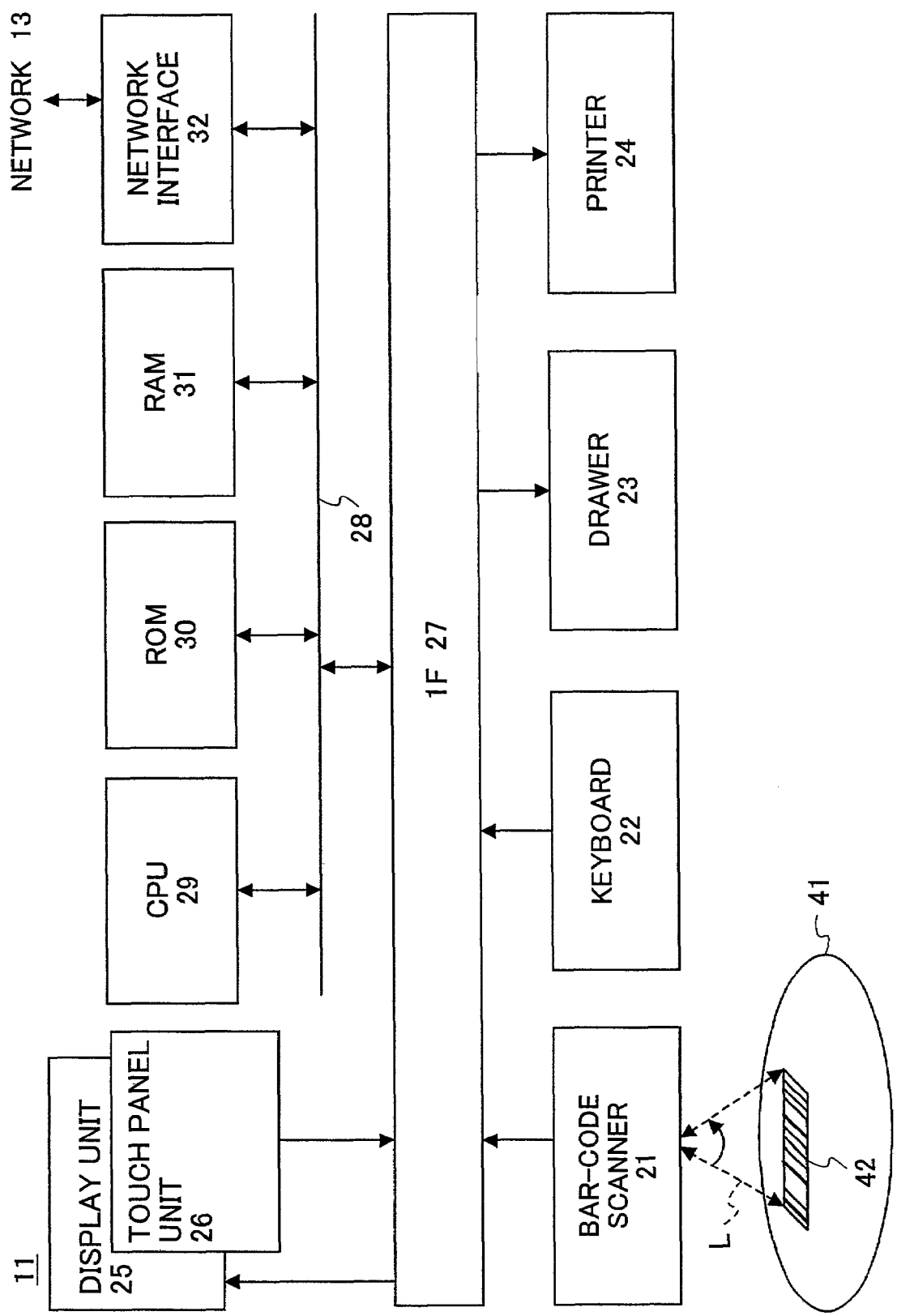
FIG. 2 is a block diagram showing the configuration of a terminal apparatus 11 according to the embodiment.

FIG. 2 is a block diagram showing the terminal apparatus 11.

The terminal apparatus 11 includes a bar-code scanner 21, a keyboard 22, a drawer 23, a printer 24, a display unit 25, a touch panel 26, an interface 27, a bus 28, a central processing unit (CPU) 29, a read only memory (ROM) 30, a random access memory (RAM) 31, and a network interface 32.

The bar-code scanner 21 emits a laser beam L. The laser beam L emitted by the bar-code scanner scans a bar-code 42 attached to merchandise 41. The laser beam L is reflected by the bar-code 42 and goes back to the bar-code scanner 21. The bar-code scanner 21 determines what the item of merchandise is by detecting the reflected laser beam L.

The keyboard 22 is used for activating functions such as merchandise registration, a discount, a subtotal, and a transaction serial number retrieval, and for inputting a department code.

FIG. 3 is a schematic drawing showing a key arrangement of the keyboard 22.

The keyboard 22 includes a registration key k1, discount keys k2-k4, a subtotal key k5, a serial number retrieval key k6, a department code input key group K7, a ten key group K8, and a total key k9. The registration key k1 is used when a merchandise code is input through the keyboard 22. The discount keys k2-k4 are used when a price discount is made. The subtotal key k5 is used when a subtotal is to be performed. The serial number retrieval key k6 is used when transaction information needs to be retrieved from the management apparatus 12 and corrected. The department code input key group K7 includes a plurality of keys for inputting department codes. The ten key group K8 includes numeral keys 0-9 and a multiplication key, etc., and is used when a plurality of one kind of merchandise is to be registered. The total key k9 is used when a transaction is finished.

The drawer 23 stores cash therein and is pulled out when the transaction is settled by cash. The printer 24 prints and outputs a receipt indicating a transaction in response to the pressing of the total key k9. The display unit 25 consists of a liquid crystal display (LCD) panel, for example. The display unit 25 displays the unit price of registered merchandise and a subtotal, for example. The touch panel unit 26 consists of a touch panel with which information is input.

The touch panel unit 26 can be used as the keyboard 22.

Peripheral apparatuses such as the bar-code scanner 21, the keyboard 22, the drawer 23, the printer 24, the display unit 25, and the touch panel 26, for example, are connected to the bus 28 through the interface 27. The interface 27 interfaces between the above peripheral apparatuses and the bus 28

The CPU 29, the ROM 30, the RAM 31, and the network interface 32 are connected to the bus 28. The CPU 29 executes a software program stored in the ROM 30. The RAM 31 is used as a working memory area of the CPU 29. The network interface 32 is connected to a network 13, and controls the communication of the terminal apparatus 11 with the management apparatus 12.

The management apparatus 12 will be described below.

Figure 4:
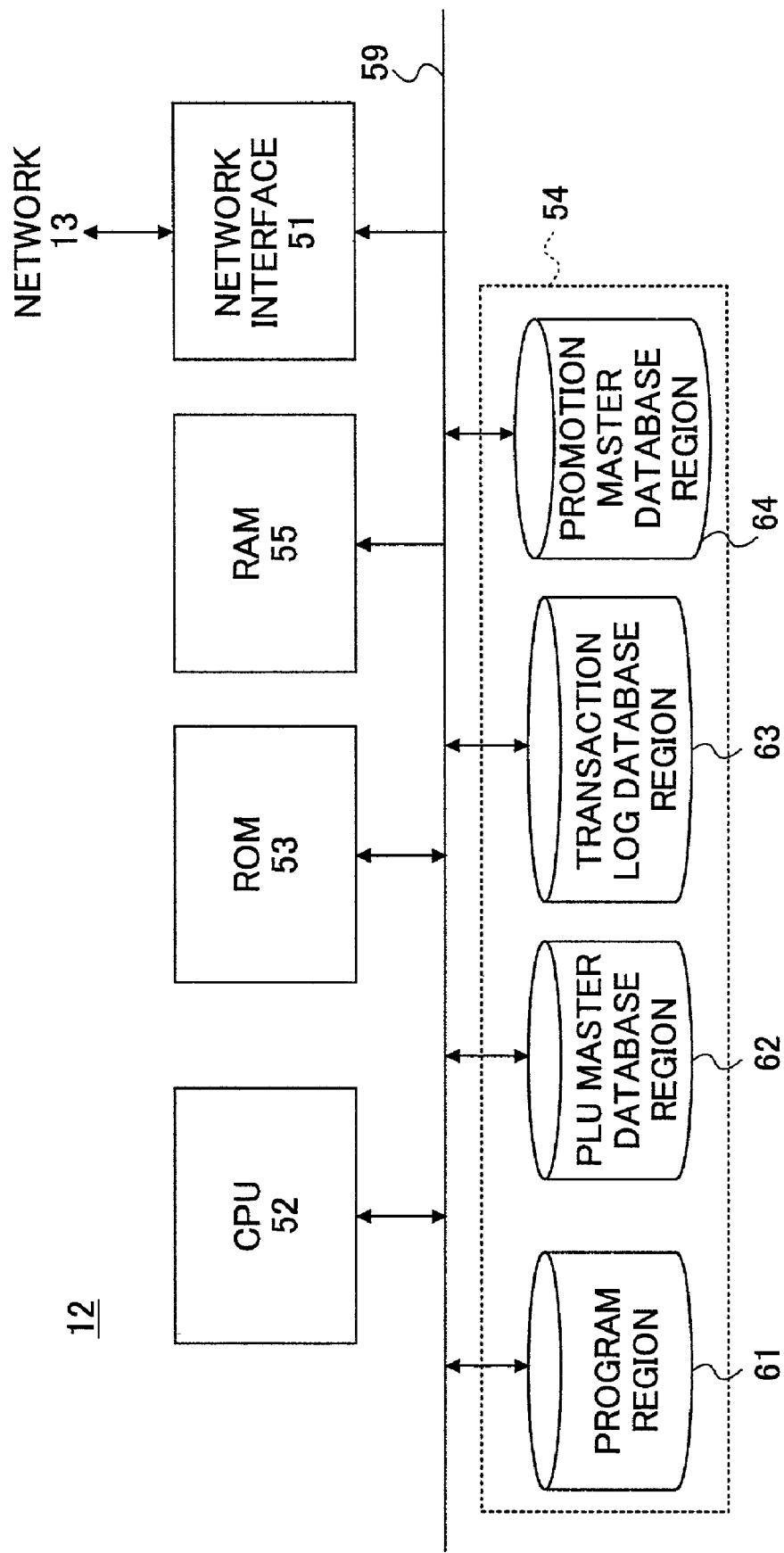
FIG. 4 is a block diagram showing the configuration of a management apparatus 12 according to the embodiment.

FIG. 4 is a block diagram showing the management apparatus 12.

The management apparatus 12 includes a network interface 51, a CPU 52, a ROM 53, a hard disk drive (HDD) 54, and a RAM 55. The network interface 51 is connected to the network 13, and controls communications with the terminal apparatus 11. The CPU 52 executes a software program stored in the ROM 53 and the HDD 54 using data stored in the ROM 53 and the HDD 54. The HDD54 includes at least a program region 61, a price look up (PLU) master database region 62, a transaction log database region 63, and a promotion master database region 64. The software program to be executed by the CPU 52 is stored in the program region 61. Data connected to unit prices of respective merchandise are stored in the PLU master database region 62.

FIG. 5 is a schematic drawing showing the data structure of the PLU master database region 62.

The PLU master database region 62 includes at least, for each item of merchandise, a department code C1, merchandise code C2, a PLU code C3, merchandise name D, and a unit price P. The department code C1 is a code by which a department that deals with the item of merchandise is identified. The merchandise code C2 is a code by which the item of merchandise is identified. The PLU code C3 is a code by which the item of merchandise is identified. The merchandise name D is the name of the item of merchandise that is scanned. The unit price P is the unit price of the item of merchandise.

The terminal apparatus 11 retrieves data connected to a PLU code C31 that is obtained by scanning the item of merchandise with the bar-code scanner 21, stored in the PLU master database region 62 and obtains a department code C11, merchandise name D1, and a unit price P1, all corresponding to the PLU code C31 of the item of merchandise. The terminal apparatus 11 generates transaction information using these data.

The transaction information generated by the terminal apparatus 11 is stored in the transaction log database region 63.

FIG. 6A is a schematic drawing showing the data structure of the transaction log database region 63.

The transaction log database region 63 includes, for each transaction, transaction identification information D11, merchandise information D12, and payment information D13. The transaction identification information D13 is information by which a transaction is identified and includes a transaction serial number D111, a terminal number D112, and a transaction classification D113.

The transaction serial number D111 is a serial number assigned to each transaction in the order that the transaction log is generated. The transaction serial number D111 is printed on the receipt. By inputting the transaction serial number D111 to the terminal apparatus 11, data related to the transaction serial number D111 can be retrieved.

The terminal number D112 is an identification number of the terminal apparatus 11 by which the transaction is settled. The transaction classification D113 indicates a classification of transaction such as an ordinary settlement and additional settlement.

The merchandise information D12 includes detailed information D121-D12$n$ of each item of merchandise. FIG. 6B further shows the data structure of the detailed information 63A.

The detailed information D121 includes a PLU code Cs, a quantity Da, tax information Db, merchandise name Dc, a unit price Dd, and manual discount information De, for example. The PLU code Cs is a code scanned by the bar-code scanner 21. By looking up the PLU code Cs in the PLU master database region 62 stored in the management apparatus 12, data such as a unit price connected to the item of merchandise is obtained.

The quantity information Da indicates a quantity of the item of merchandise of the kind that is sold in the transaction. The tax information Db indicates a tax amount that is required for the transaction. The manual discount information De indicates a discount, given in the transaction, that is input by pressing one of discount keys k2-k4 of the keyboard 22 of the terminal apparatus 11.

The payment information D13 includes information about the method of the payment such as cash or charge, and information about cash received and change given, in the case of cash payment. In the case of a payment by credit card, the payment information D13 further includes information such as credit card number and the number of installments.

The promotion master database region 64 stores information such as merchandise items for which a quantity discount is offered.

FIG. 7 shows the data structure of the promotion master database region 64.

The promotion master database region 64 includes a department code C1, merchandise code C2, a PLU code C3, a merchandise name D, a unit price P, a quantity B1 for which a quantity discount is offered, a quantity discount amount B2, and a quantity discount number B3.

The department code C1, the merchandise code C2, the PLU code C3, the merchandise name D, and the unit price P stored in the promotion master database region 64 are the same as those stored in the PLU master database region 62, respectively. The quantity B1 is a quantity for which a quantity discount is offered. The quantity discount B2 indicates a discount amount. The quantity discount number B3 is information by which the quantity discount is identified. By looking up the PLU code and the quantity of the merchandise in the promotion master database region 64, the amount of quantity discount is obtained.

Next, the operation of the transaction information management system 1 will be described in detail.

Figure 8:
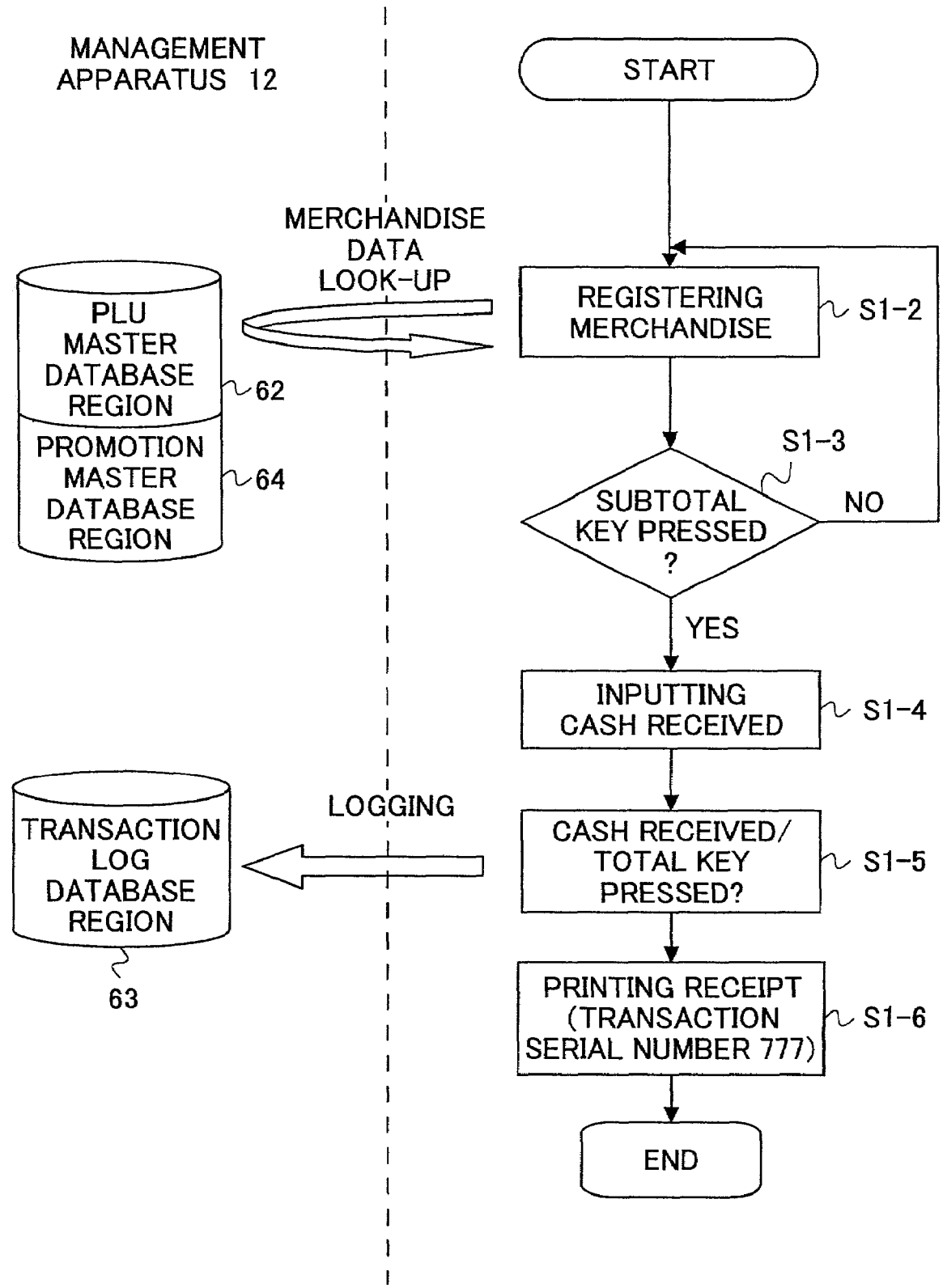
FIG. 8 is a flow diagram showing merchandise registration processing according to the embodiment.

FIG. 8 is a flow diagram showing merchandise registration processing.

The terminal apparatus 11 registers merchandise 41 mainly by scanning a bar-code 42 attached to the merchandise 41 with the bar-code scanner 21 (Step S1-2). The merchandise 41 can be registered by inputting a code necessary for the registration with the department code key group K7 and the ten key group K8 provided to the keyboard 22 as well.

In response to the input of a PLU code in step S1-2, the terminal apparatus 11 accesses the management apparatus 12, and looks up the unit price and the discounted amount of the merchandise corresponding to the PLU code in the PLU master database region 62 and the promotion master database region 64. This is so-called PLU processing.

By performing the PLU processing, the terminal apparatus 11 generates transaction information as showed in FIGS. 6A and 6B.

Items of merchandise as many as desired can be registered by performing step S1-2 until the subtotal key k5 is pressed (S1-3). After pressing of the subtotal key k5 in step S1-3, the amount of cash received is input (S1-4). When a total cash received key k9 is pressed (S1-5), the transaction information registered in steps S1-2, S1-3, and S1-4 is transmitted to the management apparatus 12. The management apparatus 12 stores the transaction information sent by the terminal apparatus 11 in the transaction log database region 63.

In response to the pressing of the total key k9, the terminal apparatus 11 has the printer 24 print a receipt (S1-6).

Figure 9:
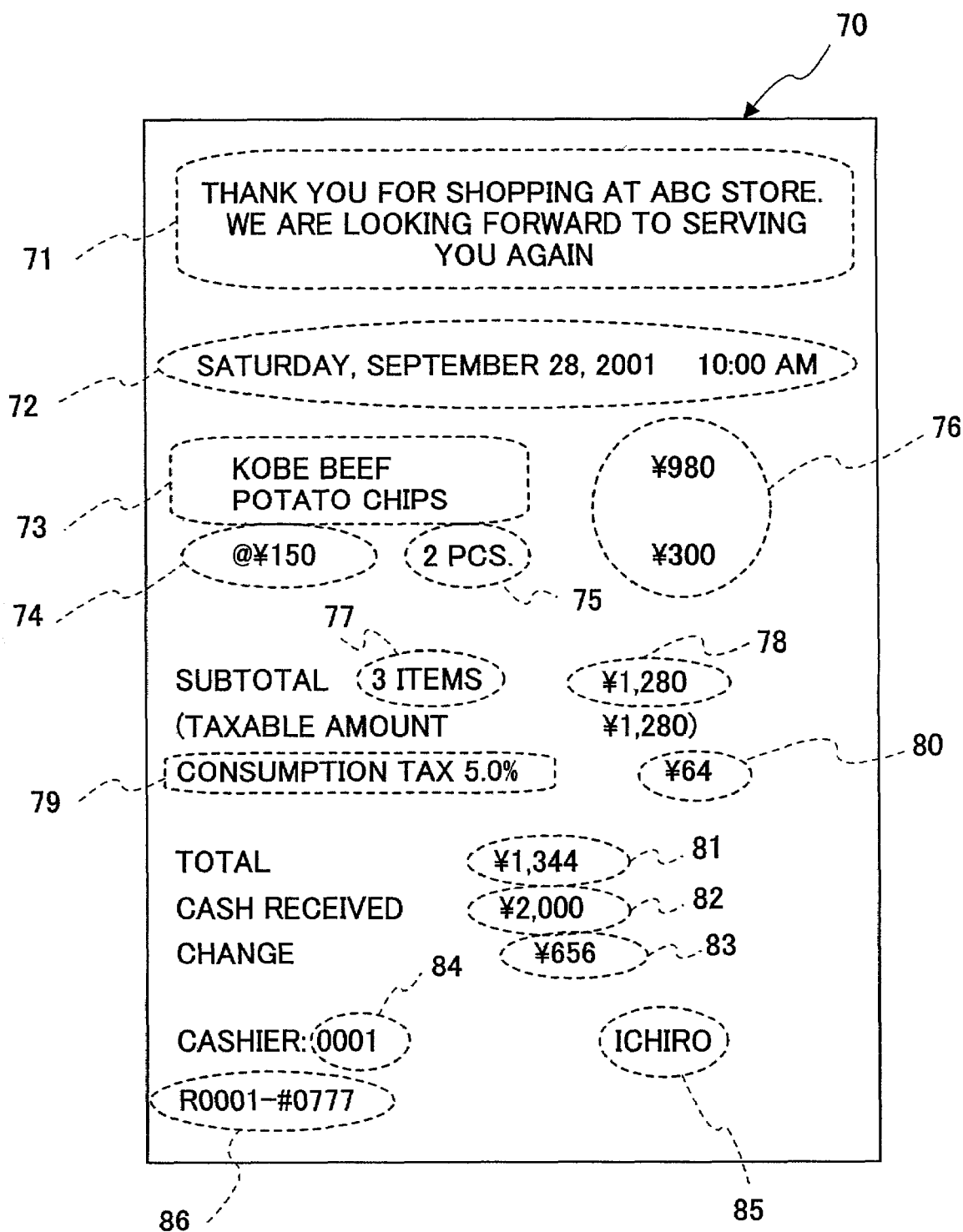
FIG. 9 is a schematic drawing showing an example of a receipt according to the embodiment.

FIG. 9 shows an example of the receipt.

In the receipt 70, the following items are printed: a message 71, a transaction date 72, merchandise sold 73, a unit price 74, sales amounts 76, a quantity 77, a subtotal 78, a tax description 79, a tax amount 80, a total 81, an amount of cash received 82, a change amount 83, an identification number of sales attendant 84, the name of the sales attendant 85, an identification number of the terminal apparatus and a transaction serial number 86.

Figure 10A:
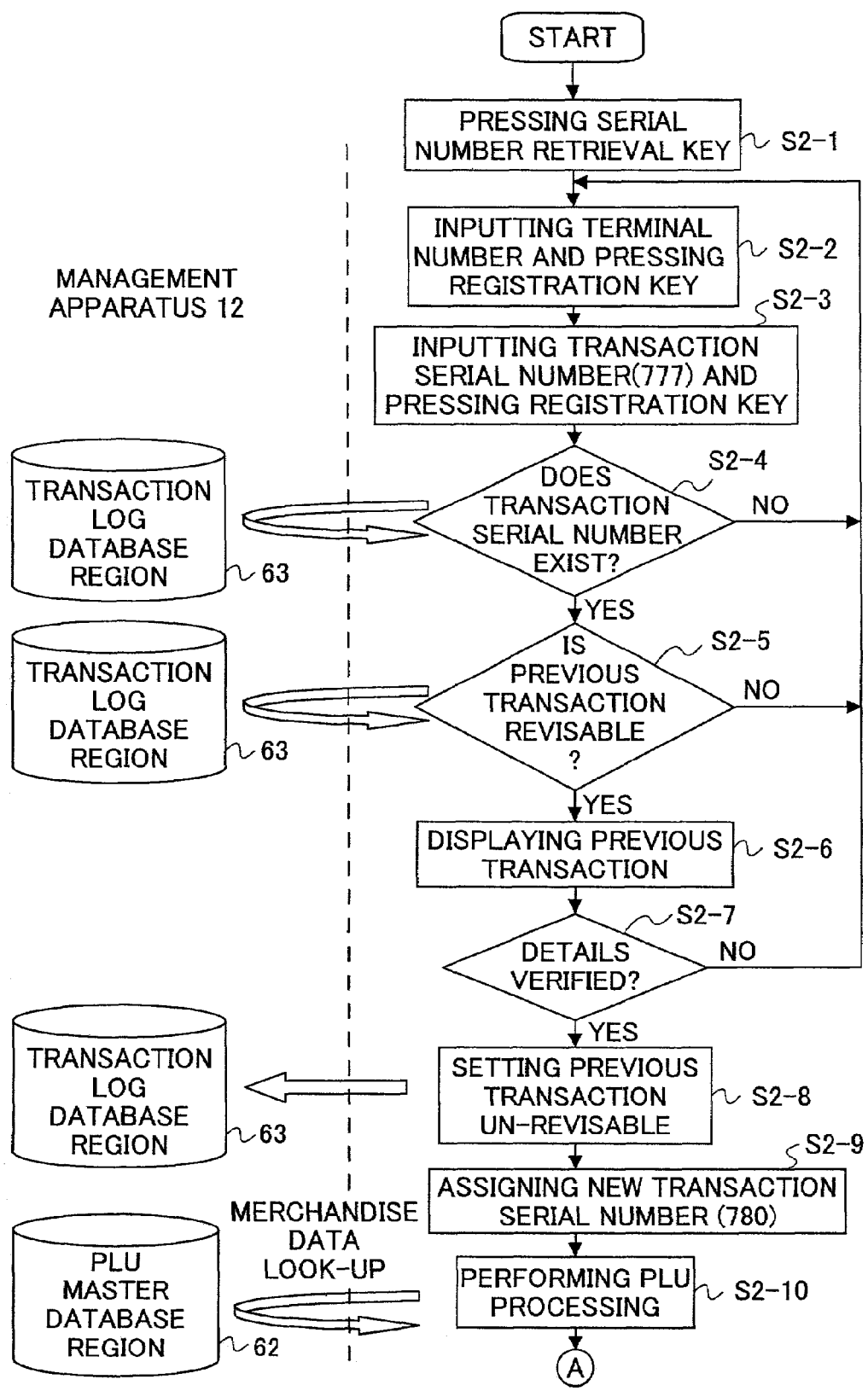
FIGS. 10A and 10B show a flow diagram of serial number retrieval processing according to the embodiment.
Figure 10B:
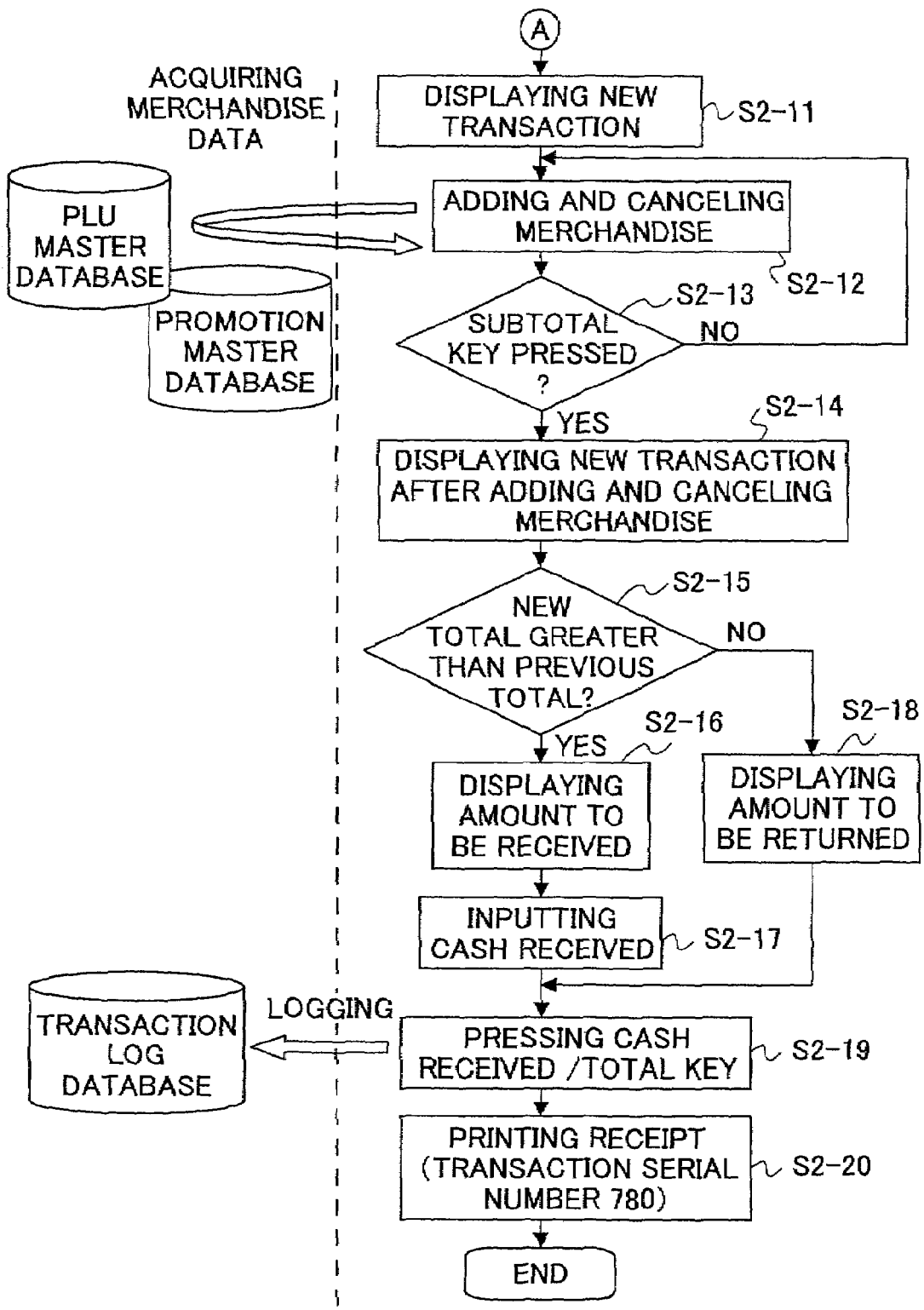

Next, a description will be given regarding serial number retrieval processing where new merchandise can be added to transaction information that has been completed when the above receipt 70 is printed or the transaction information can be corrected FIGS. 10A and 10B are flow diagrams showing serial number retrieval processing.

In response to the pressing of the serial number retrieval key k6 (S2-1), the terminal apparatus 11 displays a message on the display unit 25 requesting for the terminal serial number. The terminal apparatus 11, in response to the input of the terminal serial number followed by the pressing of the registration key k1 (S2-2), displays a message requesting for the transaction serial number. The terminal number and the transaction serial number have been printed on the receipt 70 as the terminal number 86 and the transaction number 87 at the bottom. By reference to the receipt 70, the operator can input the required information.

When the transaction serial number is input and the registration key k1 is pressed (S2-3), the terminal apparatus 11 determines whether the input transaction serial number exists in the transaction log database region 63 of the management apparatus 12 (S2-4).

If the input transaction serial number does not exist in the transaction log database region 63, the terminal number and the transaction serial number are repeatedly requested (S2-4). If the input transaction serial number exists in the transaction log database region 63, the terminal apparatus 11 determines whether the transaction corresponding to the input transaction serial number is revisable by reference to the transaction classification information D113 in the corresponding transaction information in the transaction log database region 63 (S2-5).

If the flag in the transaction classification D113 indicates that the transaction is un-revisable, that is, an addition and/or cancellation of merchandise is previously entered on the transaction, the "No" branch of S2-5 is selected and step S2-2 and the steps following S2-2 are performed because the serial number retrieval processing cannot be applied to a transaction twice. If the flag is not set, that is, the transaction is still revisable, serial number retrieval processing is performed by retrieving the transaction information corresponding to the transaction serial number and displaying it on the display unit 25 (S2-6).

If the transaction information displayed on the display unit 25 and the transaction information printed on the receipt 70 are the same, the registration key k1 is pressed (Yes branch of S2-7). In response to the pressing of the registration k1, the flag in the transaction classification D113 in the transaction log database region 63 is set in order to change the transaction classification by indicating that the transaction information has been added to existing transaction information (S2-8). A new transaction serial number is obtained (S2-9).

Next, PLU processing is performed again by looking up the PLU code in the PLU master database region 62 and the promotion master database region 64 (S2-10). The new transaction information is displayed on the display unit 25 (S2-11).

When some additional items of merchandise are sold, bar-codes attached to the respective items of merchandise are scanned with the bar-code scanner 21 (S2-12) In response to the scanning of the bar-codes, PLU processing is performed and prices are determined. In response to the pressing of the subtotal key k5 (S2-13), the price for an additional item of merchandise is calculated and displayed on the display unit 25 (S2-14). The terminal apparatus 11 compares the total amount of the previous transaction (previous amount) and the total amount of the transaction including the additional merchandise (new amount) (S2-15) and, if the previous amount is smaller than the new amount, displays an amount to be collected on the display unit 25 (S2-16). Cash is received, and the cash amount is input by the keyboard 22 (S2-17).

In response to the inputting of the cash amount and the pressing of the total key k9 (S2-19), the terminal apparatus 11 generates transaction information for the new transaction serial number acquired in S2-9 and stores the transaction information in the transaction log database region 63 of the management apparatus 12. The receipt corresponding to the transaction information is printed with the printer 24 (S2-20).

If the previous amount is greater than the new amount (S2-15), then the excess amount is displayed on the display unit 25 (S2-18) and steps S2-19 and S2-20 are performed.

An example of the serial number retrieval processing will be described below.

Figure 15:
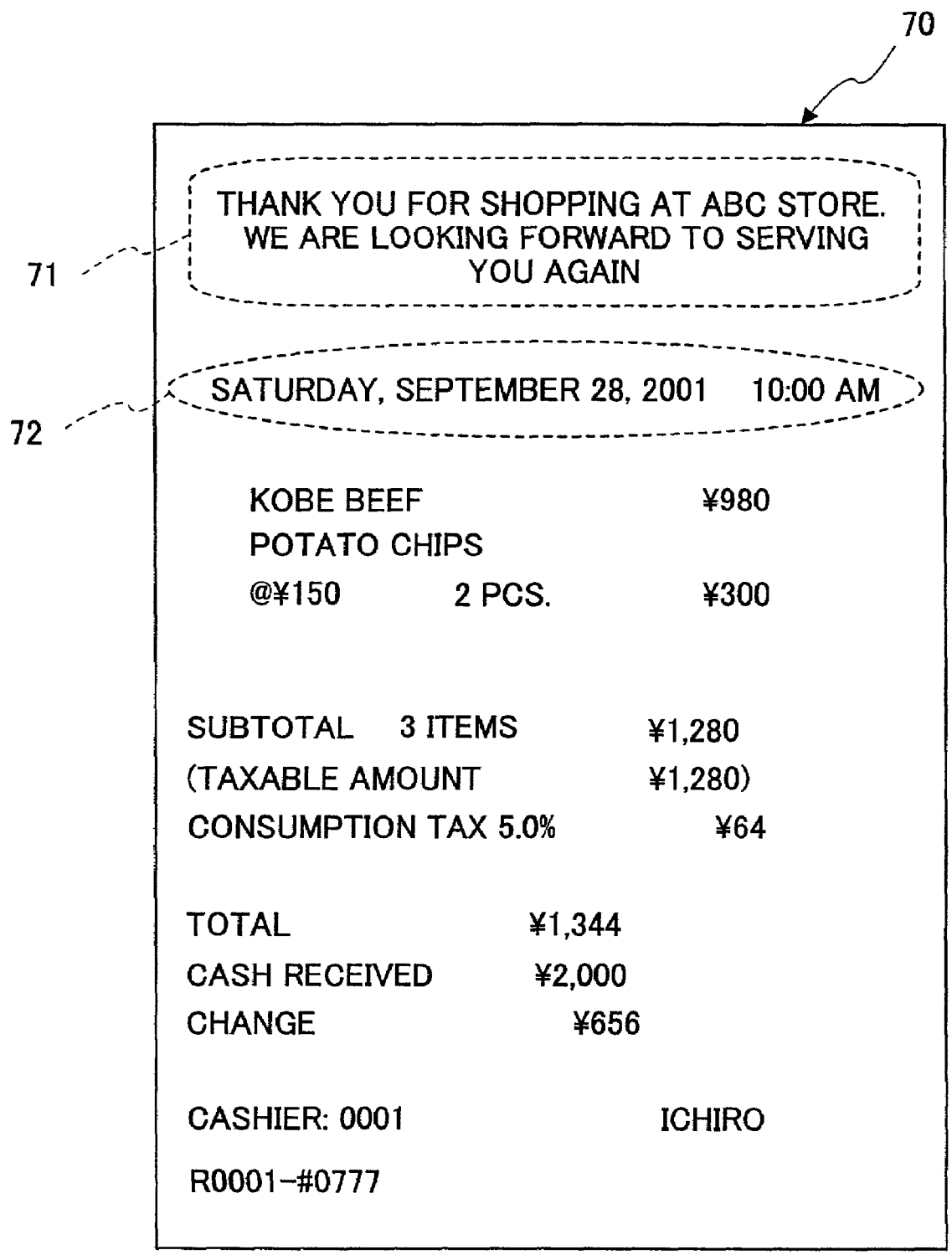
FIGS. 15 and 16 are schematic drawings showing receipts printed for a previous transaction and a new transaction, respectively according to the embodiment.
Figure 16:
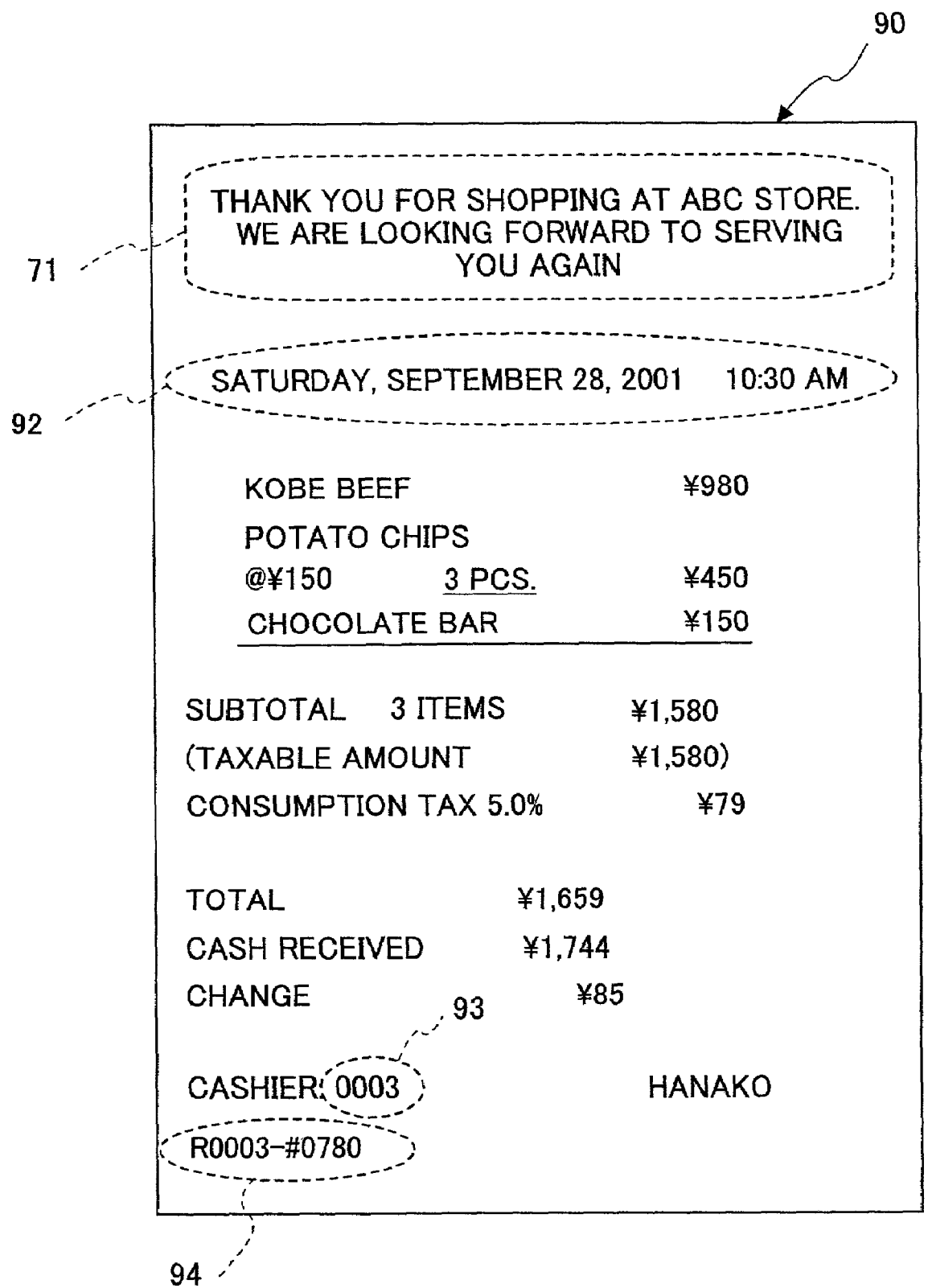

FIGS. 11-14 are schematic drawings showing the transition of screens of a transaction in which some items are additionally sold, and FIGS. 15 and 16 shows the receipt in this case.

FIG. 11 shows a screen, which is displayed in response to the pressing of the serial number retrieval key k6 at step S2-1, requesting a cashier to input the terminal number, and FIG. 12 shows a screen, which is displayed at step S2-6, indicating the previous transaction information. FIG. 13 shows a screen, which is displayed at step S2-11, indicating the transaction, and FIG. 14 shows a screen which is displayed in response to the pressing of the total key k9 at step S2-19. FIG. 15 is an example of the receipt 70 indicating the previous transaction, and FIG. 16 is an example of a receipt 90 indicating the new transaction including the additional merchandise.

In response to the pressing of the serial number retrieval key k6, a screen requesting to input the terminal number is displayed as showed in FIG. 11. A message "Please input the previous terminal number." is displayed in the screen requesting to input the terminal number showed in FIG. 11. In response to the inputting, from the keyboard 22, of the terminal number 86 printed on the receipt 70 showed in FIG. 9, "0001" for example, a screen requesting to input a transaction serial number is next displayed. In the screen requesting to input a transaction serial number, the previous terminal number that has been input is displayed as the "previous terminal number", and a message "Please input the transaction serial number" instead of the message "Please input the previous terminal number" is further displayed. The screen in which the message "Please input the transaction serial number" is not showed. In response to the inputting of the transaction serial number, if the retrieved previous transaction is a revisable transaction, a screen that reproduces the previous transaction is displayed as showed in FIG. 12.

The reproduced previous transaction is verified by comparing with the receipt. After the verification, a new transaction serial number is attached to the new transaction and PLU processing is performed again. A screen as showed in FIG. 13 is displayed. In this example, the screen showed in FIG. 13 is identical to the screen showed in FIG. 12 except for the transaction serial number because the unit prices of the respective merchandise do not change. If any of the unit prices have been changed due to a special time-limiting discount (promotion), for example, the screen showed in FIG. 13 reflects the change in the unit prices.

For example, it is assumed that bar-codes of a bag of potato chips (@¥150) and a chocolate bar (@¥150) are scanned for an additional purchase and ¥400 in cash is received. In response to the scanning of the bar-code, PLU processing is performed again. When the cash received (¥400) is input and the total key k9 is pressed, a screen indicating the new transaction as showed in FIG. 14 is displayed. The cash received ¥1,744 is a sum of the previous total ¥1,344 and the cash received ¥400. Additionally, a receipt 90 showed in FIG. 16 is printed.

The receipt 90 of the new transaction indicates in the transaction date 92 a later time than the receipt 70 of the previous transaction does because the new transaction occurs when some pieces of merchandise are sold in addition to the previous transaction. Because a bag of potato chips and a chocolate bar are added, the quantity of the potato chips is changed from "2 bags" to "3 bags" and a new row "No. 3" indicating merchandise "chocolate bar" and a total price "¥150" is added. Additionally, a total quantity is changed from "3 items" to "5 items" and a subtotal has been changed from "¥1,280" to "¥1,580". A tax amount has been changed from "¥64" to "¥79" as well. A total has been changed from "¥1,344" to "¥1,659". If ¥400 in cash is received to settle the additional purchase, cash received is changed from "¥1,344" to "¥1,744", which is the total of "¥1,344" and "¥400". Accordingly, the change becomes "¥85" that is the total "¥1,659" subtracted from the cash received "¥1,744".

If necessary, it is preferable to underline the information connected with the additional purchase such as the quantity of the bags of potato chips, the additional merchandise "chocolate bar", and the total prices. Since the new transaction is considered as a completely new transaction independent of the previous transaction, a new cashier number 93 and a new transaction serial number 94 are printed in the new receipt 90.

Figure 21:
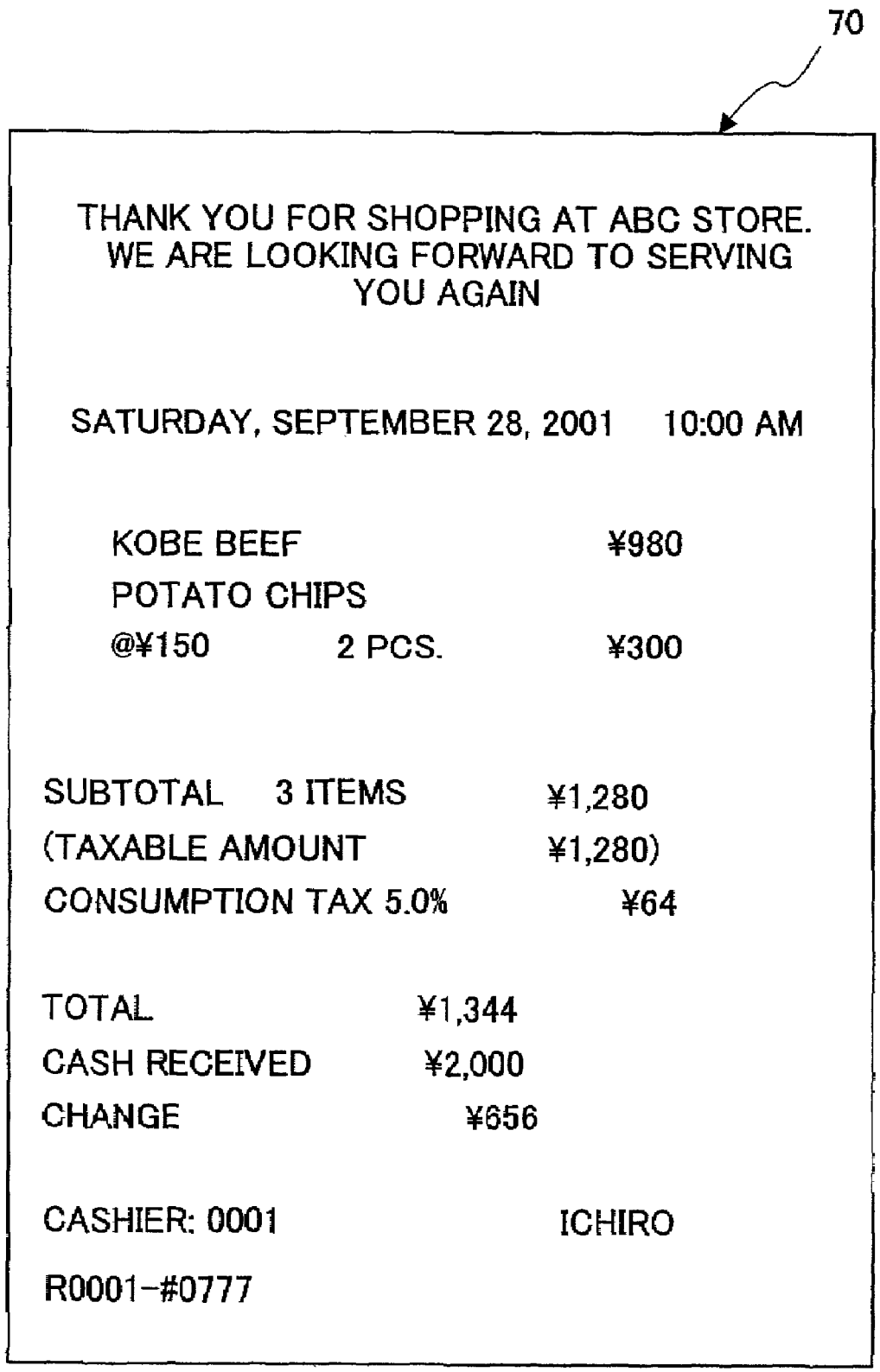
FIGS. 21 and 22 are schematic drawings showing receipts printed for a previous transaction and a new transaction, respectively according to the embodiment.
Figure 22:
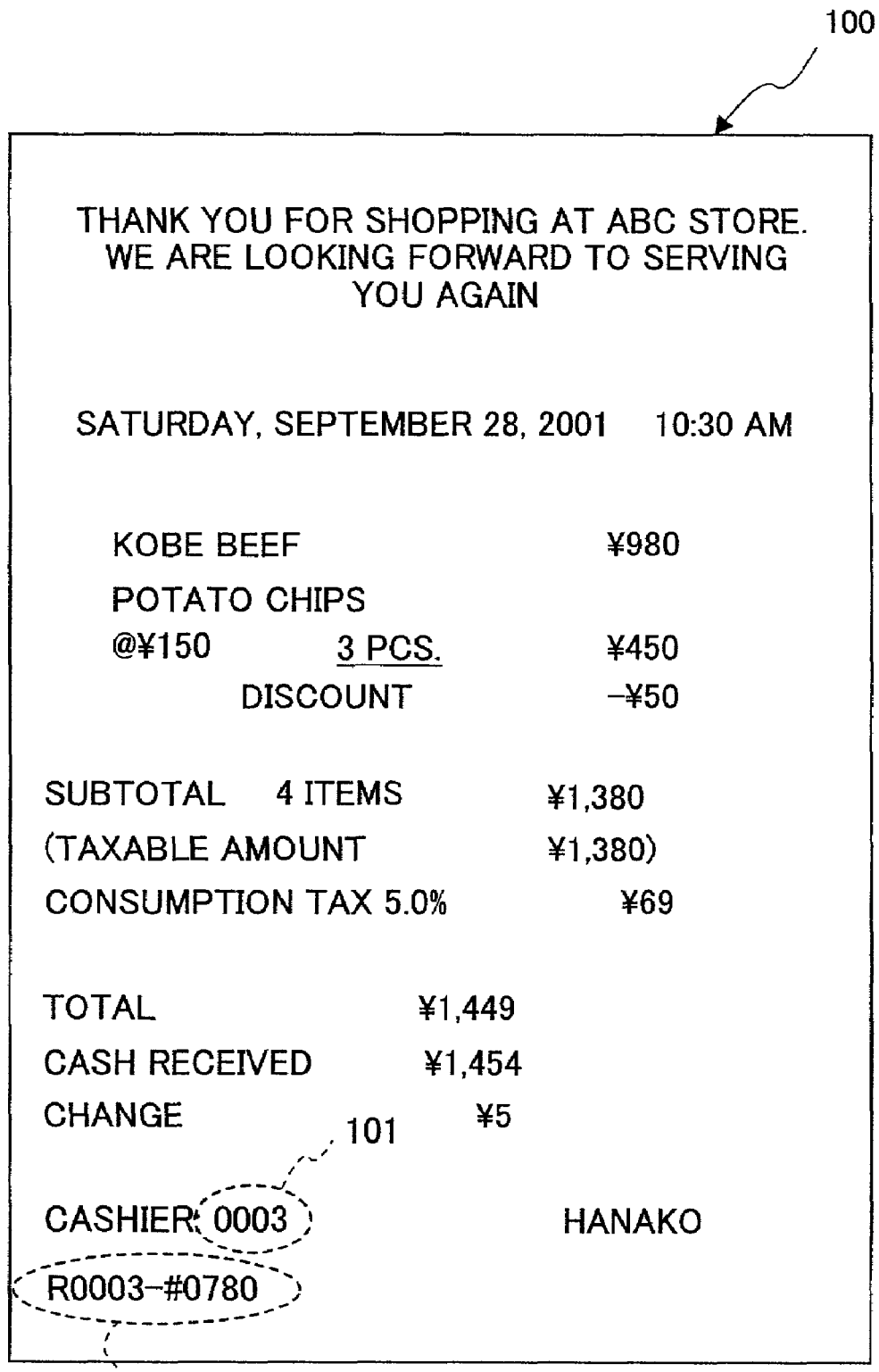

FIGS. 17-20 are schematic drawings showing the transition of screens in the case that a transaction involves merchandise for which a quantity discount is offered, and FIGS. 21 and 22 show receipts in this case. In this example, it is assumed that a bag of potato chips costs @¥150, but, if three bags are purchased, a promotional discount of ¥50 is given, that is, three bags for ¥400.

A screen requesting to input terminal number as showed in FIG. 17, which is identical to FIG. 11, is displayed in response to the pressing of the serial number retrieval key k6. FIG. 18, which is identical to FIG. 12, is a screen indicating the previous transaction that is displayed at step S2-6. FIG. 19 shows a screen indicating the new transaction that is displayed at step S2-11 and FIG. 20 is a screen that is displayed in response to the pressing of the total key k9 at step S2-19. FIG. 21 shows the receipt 70 indicating the previous transaction, and FIG. 22 is the receipt 100 connected to the new transaction.

Since the transition of screens showed in FIGS. 17-20 are identical to the screen transition showed in FIGS. 11-14, the explanation of the transition is omitted.

Two bags of potato chips have been purchased, and the additional purchase of a bag of potato chips makes the total quantity three.

If a quantity discount of ¥50 for a purchase of 3 is applicable to potato chips, the quantity discount of ¥50 is automatically applied by performing PLU processing again. If ¥110 in cash is received and the total key k9 is pressed, a screen indicating the new transaction as showed in FIG. 20 is displayed. The receipt 100 showed in FIG. 22 is printed as well.

In the receipt 100, the quantity discount "–¥50" is displayed in a discount column. If necessary, the quantity "3" may be underlined to highlight the change. Since the new transaction is independent from the previous transaction, the cashier number 101 and the transaction serial number 102 are replaced with new ones.

Figure 27:
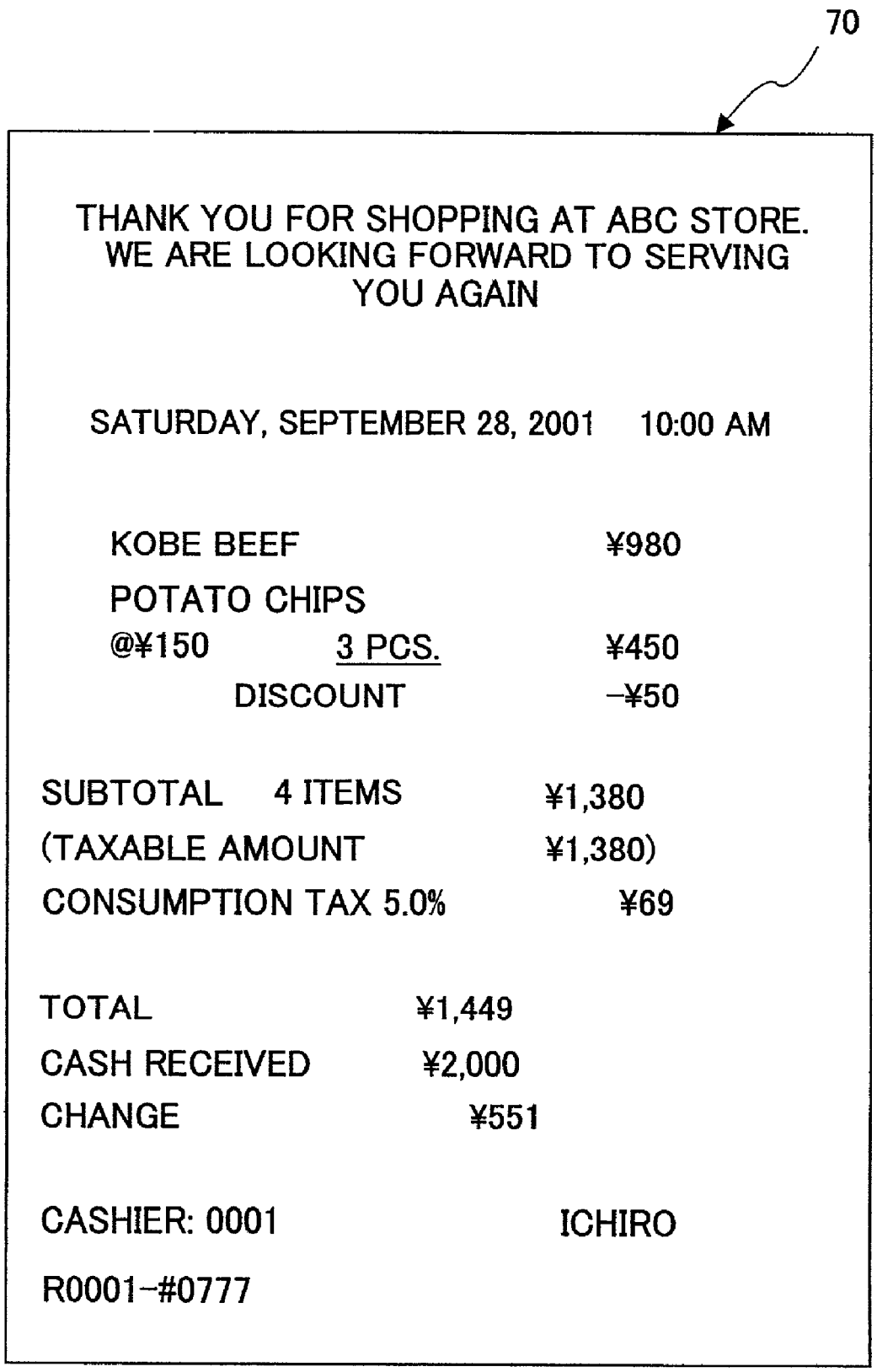

FIGS. 23-26 are schematic drawings showing the transition of screens in the case that a purchase of merchandise to which a quantity discount has been applied is canceled, and FIGS. 27 and 28 show receipts in this case.

FIG. 23 shows a screen requesting to input a terminal number that is displayed in response to the pressing of the serial number retrieval key k6, and FIG. 24 shows a screen indicating the previous transaction that is displayed at step S2-6. FIG. 25 shows a screen indicating the new transaction that is displayed at step S2-11, and FIG. 26 shows a screen that is displayed in response to the pressing of the total key k9 at step S2-19. FIG. 27 shows the receipt 70 of the previous transaction, and FIG. 28 shows a receipt 200 of the new transaction. Since the transition of FIGS. 23-26 is identical to the transition of FIGS. 11-14, the explanation of the transition is omitted.

One of the three bags of potato chips purchased at the previous transaction is canceled.

Because the quantity discount is in this case applicable to a purchase of 3 bags of potato chips, but not to a purchase of 2 bags, the quantity discount is not applied when PLU processing is performed again, that is, the quantity discount is canceled. If ¥105 in cash is refunded and the total key k9 is pressed, the screen showed in FIG. 26 is displayed and the receipt 200 showed in FIG. 28 is printed.

In the receipt 200, the description of the quantity discount "–¥50" is deleted because no quantity discount is applicable to the purchase of 2 bags of potato chips. If necessary, the quantity "2"bags of potato chips may be highlighted by underlining. A new cashier number and a new transaction serial number are indicated as the cashier number 201 and the transaction serial number 202 of the receipt 200.

According to an embodiment of the present invention, an additional purchase and a cancellation are considered as a new transaction independent from a previous transaction, and PLU processing is performed. As described by reference to FIGS. 17-22, if the previous transaction does not satisfy the condition of a quantity discount but the new transaction including the additional purchase satisfies the condition, the quantity discount can be applied to the new transaction by performing PLU processing again In the case that a special time-limiting discount is offered, the time-limiting discount may be applied to the new transaction by performing PLU processing again.

In the case that a purchase of some pieces of merchandise is cancelled, a quantity discount applied to the previous transaction can be cancelled by performing PLU processing again.

A receipt indicating all the merchandise, quantity thereof, and unit price thereof that are purchased as a result of both the previous transaction and the additional transaction is printed as if an imaginary single transaction has been made.

The preferred embodiments of the present invention are described above. The present invention is not limited to these embodiments, but various variations and modifications may be made without departing from the scope of the present invention.

This patent application is based on Japanese priority patent application No. 2001-302986 filed on Sep. 28, 2001, the entire contents of which are hereby incorporated by reference.

What is claimed is:

1. A POS terminal that registers, through a computer network, a transaction log in a transaction database, comprising a central processing unit that acquires first identification information of the transaction log and retrieves, from said transaction database, said transaction log indicating an item of merchandise, a quantity thereof, and a unit price thereof, wherein said central processing unit further determines whether said transaction log is in a revisable state, revises, if said transaction log is in said revisable state, said transaction log by allowing a cashier to change said item of merchandise, increase and decrease said quantity thereof and determine said unit price of said item of merchandise by reference to price information stored in a price database, registers the revised transaction log in said transaction database having new identification information, the revised transaction log being newly and separately generated from the retrieved transaction log and sets said transaction log in an un-revisable state.

2. The POS terminal as claimed in claim 1, wherein said transaction log registered in said transaction database is deleted in response to the revising of said transaction log by said POS terminal.

3. The POS terminal as claimed in claim 1, wherein a portion of the revised transaction log different from said transaction log registered in said transaction database is highlighted when the revised transaction log is printed.

4. A POS system that registers, through a computer network, a transaction log in a transaction database, comprising:
　a POS server having a transaction database and a price database; and
　a POS terminal that acquires first identification information of the transaction log and retrieves, from said transaction database, said transaction log indicating an item of merchandise, a quantity thereof, and a unit price thereof,
　wherein said POS terminal further determines whether said transaction log is in a revisable state, revises, if said transaction log is in said revisable state, said transaction log by allowing a cashier to change said item of merchandise, increase and decrease said quantity thereof and determine said unit price of said item of merchandise by reference to price information stored in the price database, registers the revised transaction log in said transaction database having new identification information, the revised transaction log being newly and separately generated from the retrieved transaction log and sets said transaction log in an un-revisable state.

5. The POS system as claimed in claim 4, wherein said transaction log registered in said transaction database is deleted in response to the revising of said transaction log by said POS terminal.

6. The POS system as claimed in claim 4, wherein a portion of said revised transaction log different from said transaction log is highlighted when the revised transaction log is printed.

7. A computer readable recording medium encoded with a computer program for registering, through a computer network, a transaction log in a transaction database, the program when executed by a computer causes the computer to perform the process comprising:
　acquiring first identification information of the transaction log and retrieving, from said transaction database, said transaction log indicating an item of merchandise, a quantity thereof, and a unit price thereof, and
　determining whether said transaction log is in a revisable state, revising, if said transaction log is in said revisable state, said transaction log by allowing a cashier to change said item of merchandise, increase and decrease said quantity thereof and determine said unit price of said item of merchandise by reference to price information stored in a price database, registering the revised transaction log in said transaction database having new identification information, the revised transaction log being newly and separately generated from the retrieved transaction log and setting said transaction log in an un-revisable state.

8. The computer readable recording medium as claimed in claim 7, further comprising deleting said transaction log in response to the revising of said transaction log.

9. The computer readable recording medium as claimed in claim 7, further comprising highlighting a portion of the revised transaction log different from said transaction log registered in said transaction database when said computer prints the revised transaction log.

* * * * *